United States Patent

Low et al.

[15] 3,700,869

[45] Oct. 24, 1972

[54] PSEUDONOISE SEQUENCE GENERATORS WITH THREE-TAP LINEAR FEEDBACK SHIFT REGISTERS

[72] Inventors: George M. Low, Acting Administrator of the National Aeronautics and Space Administration with respect to an invention of; Marvin Perlman, 11000 Dempsey Avenue, Granada Hills, Calif. 91344

[22] Filed: Dec. 4, 1970

[21] Appl. No.: 95,183

[52] U.S. Cl. ............235/152, 340/146.1 AL, 331/78

[51] Int. Cl. ............................G06f 1/02, G06f 15/34

[58] Field of Search..............235/152; 340/146.1 AL; 331/78;.444/1

[56] References Cited

UNITED STATES PATENTS

| | | | |
|---|---|---|---|
| 3,155,818 | 11/1964 | Goetz | 340/146.1 X |
| 3,164,804 | 1/1965 | Burton et al. | 340/146.1 |
| 3,162,837 | 12/1964 | Meggitt | 340/146.1 |

*Primary Examiner*—Joseph F. Ruggiero
*Assistant Examiner*—James F. Gottman
*Attorney*—Monte F. Mott, Paul F. McCaul and John R. Manning

[57] ABSTRACT

A PN linear recurring binary sequence generator is described. It comprises a linear feedback shift register of r stages with three-tap feedback logic. The three stages which are fed back are $i, j$ and $r$, wherein $i<j<r$. The stages $i, j$ and $r$ are selected to correspond to the exponents of a tetranomial which includes either an $(r-1)^{th}$ degree or an $(r-2)^{th}$ degree primitive polynominal over GF(2) as a factor. The PN sequence length is $2^{r-1}-1$ or $2^{r-2}-1$ when the shift register is properly initialized.

11 Claims, 3 Drawing Figures

| i | j | r | i | j | r | i | j | r | i | j | r | i | j | r | i | j | r |
|---|---|---|---|---|---|---|---|---|---|---|---|---|---|---|---|---|---|
| 1 | 3 | 4 | 1 | 2 | 13 | 5 | 9 | 18 | 2 | 19 | 23 | 9 | 15 | 28 | 3 | 25 | 32 |
| 1 | 2 | 5 | 2 | 9 | | 2 | 3 | 19 | 6 | 7 | | 1 | 2 | 29 | 5 | 11 | |
| 1 | 4 | 7 | 4 | 7 | | 2 | 11 | | 1 | 3 | 24 | 1 | 10 | | 2 | 9 | 33 |
| 2 | 3 | | 5 | 6 | | 7 | 10 | | 5 | 15 | | 2 | 17 | | 2 | 25 | |
| 1 | 2 | 9 | 1 | 12 | 15 | 5 | 7 | 20 | 1 | 22 | 25 | 7 | 16 | | 7 | 24 | |
| 1 | 6 | | 2 | 3 | | 5 | 11 | | 3 | 20 | | 13 | 14 | | 10 | 17 | |
| 1 | 5 | 10 | 3 | 10 | | 1 | 2 | 21 | 7 | 16 | | 5 | 9 | 30 | 1 | 13 | 34 |
| 1 | 4 | 11 | 4 | 5 | | 1 | 6 | | 8 | 15 | | 1 | 8 | 31 | 1 | 29 | |
| 3 | 6 | | 1 | 7 | 16 | 7 | 12 | | 1 | 17 | 26 | 2 | 27 | | | | |
| 4 | 5 | | 1 | 14 | 17 | 1 | 18 | 22 | 3 | 19 | | 3 | 6 | | | | |
| 1 | 3 | 12 | 3 | 4 | | 3 | 15 | | 1 | 20 | 27 | 3 | 26 | | | | |
| | | | 3 | 12 | | 2 | 11 | 23 | 2 | 3 | | 5 | 24 | | | | |
| | | | 6 | 9 | | | | | 9 | 16 | | 7 | 22 | | | | |
| | | | | | | | | | | | | 9 | 12 | | | | |

MARVIN PERLMAN
*INVENTOR.*

BY Paul McCaul
Monte F. Mott
ATTORNEYS

FIG. 2

| i | j | r |
|---|---|---|
| 1 | 2 | 4 |
| 1 | 3 | 5 |
| 1 | 2 | 6 |
| 2 | 3 | |
| 1 | 5 | 7 |
| 2 | 4 | |
| 1 | 2 | 8 |
| 1 | 4 | |
| 1 | 6 | |
| 3 | 4 | |
| 2 | 6 | 9 |
| 3 | 5 | |
| 2 | 3 | 10 |
| 2 | 5 | |
| 3 | 6 | |
| 1 | 3 | 11 |
| 2 | 4 | |
| 2 | 7 | 12 |
| 1 | 2 | 14 |
| 2 | 5 | |
| 2 | 7 | |
| 2 | 11 | |
| 3 | 4 | |
| 4 | 9 | |
| 5 | 8 | |

| i | j | r |
|---|---|---|
| 3 | 5 | 15 |
| 5 | 7 | |
| 6 | 8 | |
| 1 | 2 | 16 |
| 1 | 14 | |
| 2 | 11 | |
| 2 | 13 | |
| 3 | 6 | |
| 3 | 12 | |
| 4 | 5 | |
| 4 | 11 | |
| 5 | 10 | |
| 7 | 8 | |
| 1 | 11 | 17 |
| 4 | 10 | |
| 1 | 12 | 18 |
| 1 | 14 | |
| 2 | 7 | |
| 2 | 9 | |
| 3 | 8 | |
| 4 | 5 | |
| 4 | 11 | |
| 5 | 6 | |
| 1 | 7 | 19 |
| 6 | 12 | |
| 7 | 11 | |

| i | j | r |
|---|---|---|
| 1 | 14 | 20 |
| 2 | 11 | |
| 5 | 14 | |
| 1 | 3 | 21 |
| 1 | 11 | |
| 3 | 11 | |
| 4 | 6 | |
| 4 | 12 | |
| 6 | 8 | |
| 8 | 10 | |
| 1 | 8 | 22 |
| 1 | 16 | |
| 2 | 9 | |
| 3 | 12 | |
| 4 | 7 | |
| 6 | 9 | |
| 1 | 21 | 23 |
| 2 | 8 | |
| 2 | 16 | |
| 1 | 2 | 24 |
| 1 | 12 | |
| 1 | 18 | |
| 2 | 15 | |
| 2 | 21 | |
| 3 | 8 | |
| 3 | 16 | |
| 3 | 20 | |
| 4 | 17 | |
| 5 | 12 | |

| i | j | r |
|---|---|---|
| 5 | 16 | 24 |
| 6 | 7 | |
| 6 | 13 | |
| 7 | 14 | |
| 8 | 9 | |
| 10 | 11 | |
| 2 | 14 | 25 |
| 5 | 19 | |
| 6 | 14 | |
| 8 | 14 | |
| 1 | 4 | 26 |
| 1 | 12 | |
| 1 | 18 | |
| 1 | 22 | |
| 2 | 11 | |
| 4 | 5 | |
| 4 | 15 | |
| 5 | 8 | |
| 9 | 10 | |
| 9 | 12 | |
| 9 | 16 | |
| 10 | 15 | |
| 1 | 5 | 27 |
| 1 | 15 | |
| 2 | 6 | |
| 3 | 7 | |
| 3 | 11 | |
| 5 | 13 | |
| 6 | 10 | |

| i | j | r |
|---|---|---|
| 7 | 11 | 27 |
| 7 | 17 | |
| 2 | 5 | 28 |
| 5 | 15 | |
| 5 | 22 | |
| 6 | 15 | |
| 6 | 21 | |
| 1 | 17 | 29 |
| 2 | 22 | |
| 3 | 15 | |
| 3 | 19 | |
| 4 | 24 | |
| 8 | 20 | |
| 11 | 17 | |
| 2 | 13 | 30 |
| 3 | 22 | |
| 4 | 11 | |
| 4 | 23 | |
| 6 | 7 | |
| 9 | 16 | |
| 11 | 12 | |
| 11 | 18 | |
| 2 | 12 | 31 |
| 9 | 21 | |
| 1 | 4 | 32 |
| 1 | 8 | |
| 1 | 14 | |

| i | j | r |
|---|---|---|
| 1 | 24 | 32 |
| 1 | 28 | |
| 2 | 19 | |
| 3 | 4 | |
| 3 | 6 | |
| 3 | 24 | |
| 4 | 15 | |
| 4 | 19 | |
| 4 | 25 | |
| 5 | 20 | |
| 6 | 7 | |
| 6 | 19 | |
| 7 | 8 | |
| 7 | 12 | |
| 9 | 16 | |
| 9 | 18 | |
| 10 | 13 | |
| 11 | 20 | |
| 13 | 14 | |
| 13 | 16 | |
| 2 | 10 | 33 |
| 4 | 14 | |
| 10 | 14 | |
| 11 | 19 | |
| 1 | 14 | 34 |
| 2 | 11 | |
| 2 | 21 | |
| 4 | 13 | |
| 9 | 14 | |
| 13 | 16 | |

MARVIN PERLMAN
*INVENTOR.*

BY Paul F. McCaul
Monte F. Mott
ATTORNEYS

PSEUDONOISE SEQUENCE GENERATORS WITH THREE-TAP LINEAR FEEDBACK SHIFT REGISTERS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention:

The present invention relates to a pseudonoise (PN) linear recurring binary sequence generator and, more particularly, to a linear feedback shift register with three-tap feedback logic for generating PN linear recurring binary sequences.

2. Description of the Prior Art:

As is appreciated, the most efficient arrangement for generating a PN linear recurring binary sequence, hereafter referred to as a PN sequence, of length $2^{(r-1)}-1$ is one comprising a linear feedback shift register (FSR) of $(4-1)$ stages with two-tap feedback logic. Basically, the two-tap $(4-1)$ stage linear FSR is characterized by an $(r-1)^{th}$ degree primitive trinomial over GF(2). There are however many values of $(r-1)$ with which a $2^{(r-1)}-1$ PN sequence cannot be realized with only two-tap feedback logic. This is the case for values of $(r-1)$ for which primitive trinomials do not exist. For those cases four and more tap feedback logic must be employed. The increase in the number of taps in the feedback logic greatly increases circuit complexity, therefore, resulting in increased cost and reduced reliability. A need therefore exists for a multistage linear FSR which is capable of providing a PN sequence of length $2^{(r-1)}-1$ with as few taps in the feedback logic as possible for as many values of $(r-1)$ as possible including those for which primitive trinomials do not exist.

OBJECTS AND SUMMARY OF THE INVENTION

It is a primary object of the present invention to provide a new linear FSR with multi-tap feedback logic for generating PN sequences.

Another object of the present invention is to provide a linear FSR with feedback logic with fewer taps, than herebefore required, to generate a PN sequence of length $2^{r-1}-1$, where r—1 represents a degree for which a primitive trinomial does not exist.

A further object of the present invention is to provide a linear FSR for providing a PN sequence of length $2^{r-1}-1$ with feedback logic of a minimum number of taps for values of $r-1$ for which there are not primitive trinomials.

These and other objects of the invention are achieved in an embodiment comprising a shift register of r stages. The outputs of three of the stages designated $i$, $j$ and $r$ where $i<j<r$ are modulo 2 summed and the summation is fed back as the input to the first stage. The stages $i$, $j$ and $r$ are selected to be equal to the exponents of the terms of a tetranomial which is factorable to include a primitive polynomial of degree $r-1$. Such a feedback shift register, when initially set so that all stages except the $r^{th}$ (last) stage are in one binary state and the last stage is in the opposite binary state, produces a $2^{r-1}-1$ PN sequence with only three-tap feedback logic. However, the number of stages which is required is r.

In another embodiment of the invention $i$, $j$ and $r$ are selected to correspond to the exponents of a tetranomial which when factorable includes a primitive polynomial of degree $r-2$. In the latter embodiment the PN sequence length is $2^{r-2}-1$.

The novel features of the invention are set forth with particularity in the appended claims. The invention will best be understood from the following description when read in conjunction with the accompanying drawings.

BRIEF DESCRIPTION OF THE DRAWINGS

FIG. 1 is a simple block diagram of the present invention; and

FIGS. 2 and 3 are tables useful in highlighting the advantages of the invention.

DESCRIPTION OF THE PREFERRED EMBODIMENTS

Figures 1, 3:
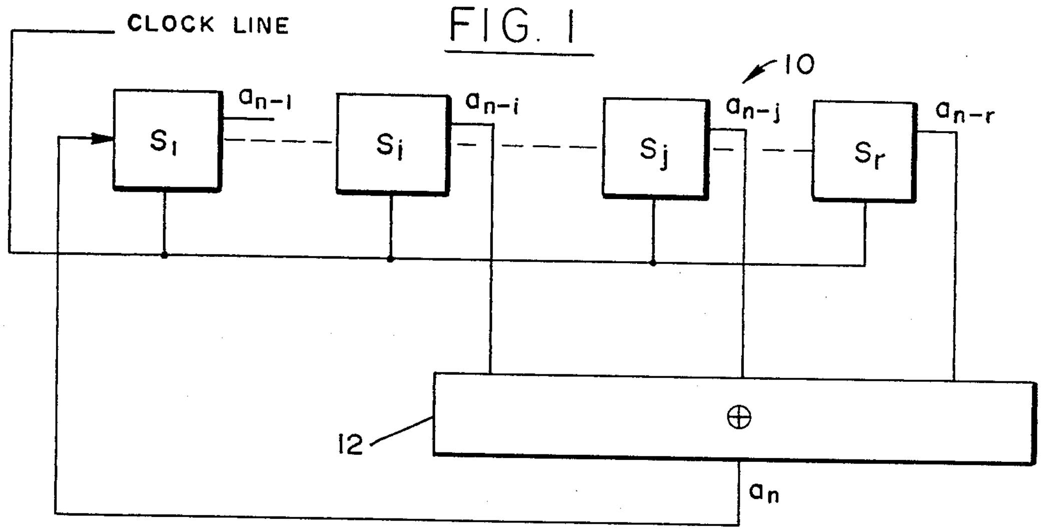

As shown in FIG. 1, the novel linear FSR with multitap feedback logic of the present invention comprises a succession of $r$ bistable elements, such as flip-flops, designated $S_1$ through $S_r$. Stage $S_r$ is the last stage, stage $S_j$ is other than the last or first stage while stage $S_i$ is any stage preceding stage $S_j$. Thus, $i<j<r$. Stage $S_i$ may be the first stage, though in FIG. 1, $S_i$ is other than the first stage, $S_l$. The stages are connected to form a shift register 10, with the assertion (true) output of each stage at a clock pulse time n being supplied as the input to the succeeding stage, with the output of $S_r$ representing the output of the FSR. The assertion outputs are designated $a_{n-1}$, $a_{n-i}$, $a_{n-j}$ and $a_{n-r}$.

Associated with the stages is a three-tap feedback logic unit 12 to which the assertion outputs of stages $S_i$, $S_j$ and $S_r$ are fed. Therein, the unit 12 performs modulo 2 summation on these three outputs and provides a summation output $a_n$ which is supplied as the feedback input to the first stage $S_1$. Thus, $a_n=a_{n-i}+a_{n-j}+a_{n-r}$, where + denotes modulo 2 sum.

It is submitted that without any added information as to the selection of the three stages which are fed back to unit 12, the particular arrangement shown in FIG. 1 is not new. It is shown for example in a copending application Ser. No. 712,065, now U.S. Pat. No. 3,535,642, filed by the inventor of the present invention on Mar. 11, 1968. The novelty however resides in the particular i, j, and r stages which are fed back to provide a PN sequence of $2^{r-1}-1$ with only these three taps. This aspect may best be explained in connection with a few specific examples.

As is known primitive trinomials do not exist for many degrees of $r-1$. For example, through degree 34 primitive trinomials do not exist of degree $r-1$ equal to 8, 12, 13, 14, 16, 19, 24, 26, 27, 30 and 32. Therefore, for these values of $r-1$, it is impossible to generate a PN sequence of length $2^{r-1}-1$, with $r-1$ stages and with a two-tap feedback logic unit, which is the most efficient way of generating such a PN code, since two taps represents the minimum number of feedback taps. For those cases where a PN sequence of length $2^{r-1}-1$ is needed for which there exists no primitive trinomial of degree $r-1$, herebefore feedback logic with four or more even number of taps has been employed. Clearly, the increased number of taps greatly increases circuit complexity and cost and accounts for reduced reliability.

In accordance with the teachings of the present invention it has been discovered that a PN sequence of length $2^{r-1}-1$ can be generated for values of $r-1$ with $r$ stages and with only three-tap feedback logic, provided certain conditions are met. It has been discovered that a PN sequence of length $2^{r-1}-1$ or $2^{r-2}-1$ can be generated with only three-tap feedback logic and with r stages properly initialized, for tetranomials of degree r which contains as a factor a primitive polynomial of degree $r-1$ or $r-2$. In practice, $i$, $j$ and $r$ which are selected for the feedback are equal to the exponents of the tetranomial which contains as a factor a primitive polynomial of degree $r-1$ or $r-2$.

Alternately stated, there exists tetranomials of the form $$f(x)=1+x^i+x^j+x^r=(1+x)\,\phi(x),$$

wherein the factor $\phi(x)$ is a primitive polynomial of degree $r-1$. It has been discovered that by initializing the stages, so that all the stages except the $r^{th}$ stage, $S_r$ are in one binary state, e.g., 1, and stage $S_r$ is in the other binary state, e.g., 0, and by feeding back stages $i, j$ and $r$, a PN sequence of length $2^{r-1}-1$ is generated. The complement of this PN sequence is generated when stage $S_r$ is a binary 1 and all other stages are a 0. It has been discovered that such tetranomials exist for every degree $r$, $4 \leq r \leq 34$ with the exception of degree 13. FIG. 2 to which reference is now made represents a table of all tetranomials through degree 34 with which PN sequences of length $2^{r-1}-1$ can be generated with only three taps, $i$, $j$ and $r$ with an $r$ stage shift register. As seen such sequences can be generated for all values of $r$, $4 \leq r \leq 34$ except $r=13$. Also for most values of $r$, more than one PN sequence can be generated. For example, for $r=9$, two different PN sequences of lengths $2^8-1$ can be generated, depending on whether in addition to stage 9, stages 2 and 6 or 3 and 5 are fed back. Also, for each case, a PN sequence and its complement can be generated depending on the initialization conditions, i.e., whether the stages are set to 11 . . . . 110 or to 00 . . . . 001

It is thus seen that in accordance with the present invention at least two complementary PN sequences of length $2^{r-1}-1$ can be generated with three taps for each value of $r-1$ equal to 8, 13, 14, 16, 19, 24, 26, 27, 30, 32. For all of these values of $r-1$, herebefore at least four-tap feedback logic was employed since these degrees of $r-1$ do not have primitive trinomials and therefore the PN sequences of length $2^{r-1}-1$ could not be generated by two-tap feedback logic.

The foregoing description may thus be summarized as comprising a linear FSR with three-tap feedback logic for generating a PN sequence of length $2^{r-1}-1$. The FSR includes an r stage shift register with feedback from stages $i$, $j$ and $r$ where $i$, $j$ and $r$ equal the exponents of terms of a tetranomial which includes as a $r-1$ degree primitive polynomial over GF(2) as a factor. It should be stressed that these teachings enable the generation of PN sequences of lengths $2^{r-1}-1$ for values of $r-1$ for which primitive trinomials do not exist and therefore, such sequences cannot be generated with ($r-1$) stage shift registers with only two taps. However, the invention is not limited thereto. Indeed it can be used to generate PN sequences of lengths $2^{r-1}-1$ for values of $r-1$ for which primitive trinomials do exist. In such cases the teachings will be used to provide additional PN sequences of the desired length.

This may further be accomplished by choosing $i$, $j$ and $r$ to equal the exponents of a tetranomial such as $$f(x)=1+x^i+x^j+x^r=(1+x)^2\,\theta(x),$$

wherein $\theta(x)$ represents a primitive polynomial of degree $r-2$. In such an embodiment the PN sequence length is $2^{r-2}-1$. In this embodiment it was discovered that the required initialization states are 00 . . . . 0101 or 11 . . . . 1010, for all cases where $r>4$. FIG. 3 to which reference is made is a table of all tetranomials through degree 34 with which PN sequences of length $2^{r-2}-1$ can be generated with only three taps with a r stage shift register. For example, for r=5 there is a tetranomial $$f(x)=1+x+x^2+x^5=(1+x)^2\,(1+x+x^3)$$

where $1+x+x^3$ is a primitive polynomial. Thus, by feeding back $i=1$, $j=2$ and $r=5$, a PN sequence of $2^{5-2}-1=2^3-1=7$ is generated. When the initial state is 00101, the PN sequence is 1, 1, 1, 0, 1, 0, 0, while its complement, i.e., 0, 0, 0, 1, 0, 1, 1, is generated when the initial state is 11010.

In summary in accordance with the present invention a linear FSR of $r$ stages and with three-tap feedback logic is provided for generating a PN sequence of length $2^{r-1}-1$ or $2^{r-2}-1$. The stages which are fed back are $i$, $j$ and $r$ which equal the exponents of a tetranomial which includes as a factor a primitive polynomial of either degree $r-1$ or $r-2$. It should again be stressed that in the present invention the novelty resides in the particular three stages which are fed back. These are a function of the exponents of the tetranomial which includes as a factor a primitive polynomial of either degree $r-1$ or $r-2$.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A linear feedback shift register for providing a pseudonoise linear recurring binary sequence of length $2^x-1$, comprising:

a shift register of $r$ successively interconnected binary stages, each stage being in either a first binary state or a second binary state, $r$ and $x$ being integers with $r$ being greater than 4, and $x$ being equal to not less than $r-2$ and not more than $r-1$ at least all of the first ($r-3$) stages and the ($r-1$)th stage being settable initially to a binary state opposite the binary state in which the $r^{th}$ stage is set initially; and feedback means coupled to the $i^{th}$, $j^{th}$ and $r^{th}$ stages of said shift register for providing an input to the first stage of said shift register which is a function of the modulo 2 summation of the outputs of said $i^{th}$, $j^{th}$ and $r^{th}$ stages, the $r^{th}$ stage representing the last stage, the $j^{th}$ stage representing any stage except the first and the last and the $i^{th}$ stage representing any stage ahead of said $j^{th}$ stage, $i$, $j$ and $r$ being equal to the exponents of a tetranomial of degree $r$ which includes as a factor a primitive polynomial of degree $x$.

2. The arrangement as recited in claim 1 wherein $r$ is a degree selected from the group consisting of 9, 14, 15, 17, 20, 25, 27, 28, 31 and 33.

3. The arrangement as recited in claim 1 wherein $x=r-1$ and is equal to a degree selected from the group consisting of 8, 13, 14, 16, 19, 24, 26, 27, 30 and 32.

4. The arrangement as recited in claim 1 wherein $r$ has a value selected of the group of values consisting of 5 through 12 and 14 through 34.

5. A feedback shift register for providing a pseudonoise linear recurring binary sequence of length $2^{r-1}-1$, comprising:

a shift register including a succession of $r$ interconnected binary stages, where $r$ is an integer greater than 4, each stage being in either a first binary state or a second binary state, each stage being responsive to a clock pulse to shift the binary state thereof to a succeeding stage, all of said stages except the last stage in the sequence being initially settable to said first binary state and the last stage being initially settable to said second binary state; and means coupled to the outputs of the $i^{th}$, $j^{th}$ and $r^{th}$ stages in said sequence for performing a modulo 2 summation of said outputs and for supplying the summation as an input to the first stage in said sequence, the $r^{th}$ stage representing the last stage, the $j^{th}$ stage representing any stage preceding the last stage and the $i^{th}$ stage representing a stage preceding the $j^{th}$ stage, $i$, $j$ and $r$ representing the exponents of terms of a tetranomial of degree $r$ which is factorable to include a primitive polynomial of degree $r-1$, the tetranomial being expressable as $f(x)=1+x^i+x^j+x^r=(1+x)\ \phi(x)$, wherein $\phi(x)$ is a primitive polynomial of degree $r-1$.

6. The arrangement as recited in claim 5 wherein $r-1$ is equal to any value in a group of values consisting of 8, 13, 14, 16, 19, 24, 26, 27, 30 and 32.

7. The arrangement as recited in claim 5 wherein $r$ has a value selected of the group of values consisting of 5 through 12 and 14 through 34.

8. A linear feedback shift register for providing a pseudonoise linear recurring binary sequence of length $2^{r-2}-1$ comprising:

a shift register including a succession of $r$ interconnected stages where r is an integer, each stage being in either a first binary state or a second binary state, each stage being responsive to a clock pulse to shift the binary state thereof to a succeeding stage, the $r^{th}$ and the $(r-2)^{th}$ stages being in said second binary state with all the other stages being in one of the two binary states; and means coupled to the outputs of the $i^{th}$, $j^{th}$ and $r^{th}$ stages of said shift register for performing a modulo 2 summation thereon and for supplying the summation as an input to the first stage of said shift register, the $r^{th}$ stage representing the last stage, the $j^{th}$ stage representing any stage preceding the last stage and the $i^{th}$ stage representing a stage preceding the $j^{th}$ stage, $i$, $j$ and $r$ representing the exponents of terms of a tetranomial of degree $r$ expressable as $$f(x)=1+x^i+x^j+x^r=(1+x)^2\,\theta(x)$$

wherein $\theta(x)$ represents a primitive polynomial of degree $r-2$.

9. The arrangement as recited in claim 8 wherein said r stages are settable to an initial condition with all stages from the first stage to the $(r-3)^{th}$ and the $(r-1)^{th}$ stages in the same state and the $(r-2)^{th}$ and the $r^{th}$ stages are in an opposite state.

10. The arrangement as recited in claim 9 wherein r is selected from a group of values consisting of 4, 5, 7, 9 through 13 and 15 through 34.

11. The arrangement as recited in claim 9 wherein $r-2$ is equal to any value in a group of values consisting of 8, 13, 14, 16, 19, 24, 26, 27, 30 and 32.

* * * * *